(12) United States Patent
Mitani et al.

(10) Patent No.: US 11,945,384 B2
(45) Date of Patent: Apr. 2, 2024

(54) BACKUP POWER SUPPLY SYSTEM, POWER SUPPLY BACKUP METHOD, AND PROGRAM

(71) Applicant: Panasonic Intellectual Property Management Co., Ltd., Osaka (JP)

(72) Inventors: Yohsuke Mitani, Osaka (JP); Takeshi Umeda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 136 days.

(21) Appl. No.: 17/640,996

(22) PCT Filed: Sep. 18, 2020

(86) PCT No.: PCT/JP2020/035647
§ 371 (c)(1),
(2) Date: Mar. 7, 2022

(87) PCT Pub. No.: WO2021/060220
PCT Pub. Date: Apr. 1, 2021

(65) Prior Publication Data
US 2022/0274551 A1 Sep. 1, 2022

(30) Foreign Application Priority Data

Sep. 27, 2019 (JP) .................................. 2019-178085

(51) Int. Cl.
*B60R 16/033* (2006.01)
*H02J 7/00* (2006.01)
(Continued)

(52) U.S. Cl.
CPC .......... *B60R 16/033* (2013.01); *H02J 7/0013* (2013.01); *H02J 7/34* (2013.01);
(Continued)

(58) Field of Classification Search
CPC ......... B60R 16/033; H02J 7/0013; H02J 7/34; H02J 9/06; B60T 13/74; B60T 2270/406;
(Continued)

(56) References Cited

U.S. PATENT DOCUMENTS

| | | | |
|---|---|---|---|
| 6,914,346 B2* | 7/2005 | Girard | E05B 77/12 307/9.1 |
| 2007/0145821 A1* | 6/2007 | Mekky | E05B 81/54 307/10.1 |

(Continued)

FOREIGN PATENT DOCUMENTS

| | | |
|---|---|---|
| JP | 2018-130978 | 8/2018 |
| JP | 2018-191440 | 11/2018 |
| JP | 2018-191513 | 11/2018 |

OTHER PUBLICATIONS

International Search Report of PCT application No. PCT/JP2020/035647 dated Nov. 24, 2020.

*Primary Examiner* — Alfonso Perez Borroto
(74) *Attorney, Agent, or Firm* — Rimon P.C.

(57) ABSTRACT

A backup power supply system of the present invention includes a first auxiliary power supply and a second auxiliary power supply capable of supplying electric power to a first load when failure of a main power supply occurs. In the backup power supply system, a second duration is shorter than a first duration. The first duration is the duration until the first auxiliary power supply becomes capable of supplying electric power to the first load. The second duration is the duration until the second auxiliary power supply becomes capable of supplying electric power to the first load.

20 Claims, 4 Drawing Sheets

(51) Int. Cl.
*H02J 7/34* (2006.01)
*H02J 9/06* (2006.01)
*B60T 13/74* (2006.01)
*F16H 61/00* (2006.01)
*F16H 61/12* (2010.01)

(52) U.S. Cl.
CPC .............. *H02J 9/06* (2013.01); *B60T 13/74* (2013.01); *B60T 2270/406* (2013.01); *B60T 2270/414* (2013.01); *F16H 2061/005* (2013.01); *F16H 2061/1292* (2013.01)

(58) Field of Classification Search
CPC ......... B60T 2270/414; F16H 2061/005; F16H 2061/1292
USPC ........................................................ 307/9.1
See application file for complete search history.

(56) References Cited

U.S. PATENT DOCUMENTS

| | | | |
|---|---|---|---|
| 2015/0072174 A1* | 3/2015 | DeKeuster | H01M 10/425 |
| | | | 29/623.2 |
| 2015/0072208 A1* | 3/2015 | Balk | H05K 1/18 |
| | | | 429/121 |
| 2015/0330111 A1 | 11/2015 | Dente et al. | |
| 2015/0330116 A1* | 11/2015 | Dente | B60L 58/15 |
| | | | 307/10.1 |
| 2017/0324075 A1* | 11/2017 | Dulle | H05K 1/0218 |

* cited by examiner

BACKUP POWER SUPPLY SYSTEM, POWER SUPPLY BACKUP METHOD, AND PROGRAM

CROSS-REFERENCE TO RELATED APPLICATIONS

This application is a U.S. national stage application of the PCT International Application No. PCT/JP2020/035647 filed on Sep. 18, 2020, which claims the benefit of foreign priority of Japanese patent application No. 2019-178085 filed on Sep. 27, 2019, the contents all of which are incorporated herein by reference.

TECHNICAL FIELD

The present disclosure generally relates to a backup power supply system, a power supply backup method, and a program. More specifically, the present disclosure relates to a backup power supply system capable of supplying electric power to a load when failure of a main power supply occurs, a power supply backup method, and a program.

BACKGROUND ART

PTL 1 describes a parking support device capable of allowing a vehicle to execute a parking operation using a portable terminal from the outside of the vehicle. The parking support device described in PTL 1 outputs a method for releasing a P-lock actuator for fixing a vehicle shift to a parking range and an EPB actuator for controlling an electronic parking brake (EPB) to a portable terminal when failure of a power supply occurs in a vehicle.

CITATION LIST

Patent Literatures

PTL 1: Japanese Patent Laid-Open Publication No. 2018-130978

SUMMARY

An object of the present disclosure is to provide a backup power supply system, a power supply backup method, and a program, by which a state in which no power is supplied to a load is less likely to occur when failure of a main power supply occurs.

A backup power supply system according to an aspect of the present disclosure includes first and second auxiliary power supplies capable of supplying electric power to a load when failure of a main power supply occurs. In the backup power supply system, a second duration is shorter than a first duration. The first duration is the duration until the first auxiliary power supply becomes capable of supplying electric power to the load. The second duration is the duration until the second auxiliary power supply becomes capable of supplying electric power to the load.

A power supply backup method according to an aspect of the present disclosure is a power supply backup method to be used for the backup power supply system. The backup power supply system includes first and second auxiliary power supplies capable of supplying electric power to a load when failure of a main power supply occurs. In the backup power supply system, a second duration is shorter than a first duration. The first duration is the duration until the first auxiliary power supply becomes capable of supplying electric power to the load. The second duration is the duration until the second auxiliary power supply becomes capable of supplying electric power to the load.

A program according to an aspect of the present disclosure is a program executable by one or more processors to execute the power supply backup method.

The present disclosure provides an advantageous effect that a state in which no power is supplied to the load is less likely to occur when failure of the main power supply occurs.

DESCRIPTION OF EMBODIMENTS

Exemplary Embodiments

Exemplary embodiments and modification examples described below are just examples of the present disclosure, and the present disclosure is not limited to the below-mentioned exemplary embodiments and modification examples. Embodiments other than the below-mentioned exemplary embodiments and modification examples may be employed, and various modifications depending on designs and the like can be carried out in a scope of the technical idea of the present disclosure.

(1) OUTLINE

An outline of backup power supply system 1 according to an exemplary embodiment will be described below with reference to FIGS. 1 and 2.

Backup power supply system 1 according to the embodiment is configured to be mounted on, for example, vehicle 9 (see FIG. 2), and is configured to supply electric power to a load when failure of main power supply 4 installed in vehicle 9 occurs. That is, backup power supply system 1 is configured to be mounted on vehicle 9 including main power supply 4 and a load. The "when failure of main power supply 4 occurs" in the present disclosure means that supply of electric power from main power supply 4 to a load or the like stops due to fault, deterioration or disconnection of main power supply 4.

Figure 2:
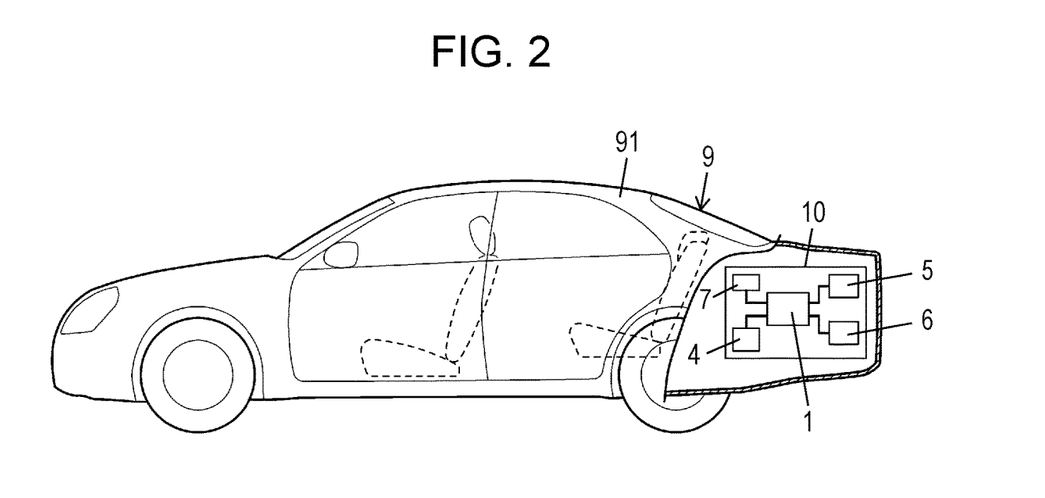
FIG. 2 is a partially broken side view of a vehicle having the backup power supply system mounted thereon.

Vehicle 9 includes drive system 10 and body (vehicle main body) 91 having drive system 10 mounted thereon (see FIG. 2). Drive system 10 includes backup power supply system 1, main power supply 4, loads (for example, first load 5 and second load 6), and electronic control unit (ECU) 7. Main power supply 4 is, for example, a battery (for example, a lead storage battery) mounted on vehicle 9, and is configured to supply electric power to the loads. ECU 7 is configured to control the loads included in vehicle 9.

First load 5 is, for example, a brake system (hereinafter, also referred to as "brake system 5"). Second load 6 is, for example, a shift-by-wire system (hereinafter, also referred to as "shift-by-wire system 6"). Note here that in FIG. 1, "shift-by-wire system 6" is represented by "SBW system 6".

Brake system 5 is configured to electrically activate a brake mechanism provided to each wheel of vehicle 9. Brake system 5 includes drive controller 51 and actuator 52. Drive controller 51 is configured to output a control signal to actuator 52 based on an operation amount of a brake pedal performed by a driver so as to control the drive of actuator 52. Actuator 52 is configured to apply a brake to each wheel by operating the brake mechanism provided to each wheel in response to a control signal from drive controller 51.

Shift-by-wire system 6 is configured to electrically switch a shift range of an automatic transmission gear mounted on vehicle 9. Shift-by-wire system 6 includes drive controller 61 and actuator 62. Drive controller 61 is configured to control drive of actuator 62 by outputting a control signal to actuator 62 based on the position of a shift lever operated by a driver. Actuator 62 is configured to switch shift ranges of automatic transmission gear in response to the control signal from drive controller 61.

The shift ranges of the automatic transmission gear includes a parking range (P range), a reverse range (R range), a neutral range (N range), and a drive range (D range). The drive range is elected when vehicle 9 moves forward. The reverse range is elected when vehicle 9 moves backward. The parking range is elected when vehicle 9 is parked. In the parking range, a rotary shaft of the automatic transmission gear is locked by actuator 62 to lock the movement of vehicle 9.

Brake system 5 and shift-by-wire system 6 are configured to operate with electric power supplied from main power supply 4 or backup power supply system 1.

When main power supply 4 is normal, electric power is supplied from main power supply 4 to first load 5 and second load 6 (that is, brake system 5 and shift-by-wire system 6). On the other hand, when failure of main power supply 4 occurs, electric power is supplied from backup power supply system 1 to first load 5 and second load 6. Even when failure of main power supply 4 occurs, first load 5 and second load 6 are thus operable in response to an operation by a driver.

Backup power supply system 1 includes first auxiliary power supply 22 and second auxiliary power supply 3. Each of first auxiliary power supply 22 and second auxiliary power supply 3 is an auxiliary power supply capable of supplying electric power to first load (load) 5 when failure of main power supply 4 occurs. In backup power supply system 1, a second duration is shorter than a first duration. The first duration is the duration until first auxiliary power supply 22 becomes capable of supplying electric power to first load 5. The second duration is the duration until second auxiliary power supply 3 becomes capable of supplying electric power to first load 5. That is, the first duration corresponds to a charging duration of first auxiliary power supply 22, and the second duration corresponds to a charging duration of second auxiliary power supply 3. Each of the first duration and the second duration is a relative duration.

In backup power supply system 1 according to the embodiment, as described above, the second duration corresponding to the charging duration of second auxiliary power supply 3 is shorter than the first duration corresponding to the charging duration of first auxiliary power supply 22. Therefore, charging of second auxiliary power supply 3 is completed earlier than first auxiliary power supply 22. Therefore, even until the first duration elapses, second auxiliary power supply 3 may supply first electric power to load 5. Thus, it is advantageous that as compared with the case where only first auxiliary power supply 22 supplies electric power to first load 5 when failure of main power supply 4 occurs, a state in which no power is supplied to first load 5 is less likely to occur when failure of main power supply 4 occurs.

(2) DETAILS

Backup power supply system 1 according to the embodiment will be detailed below with reference to FIG. 1.

Figure 1:
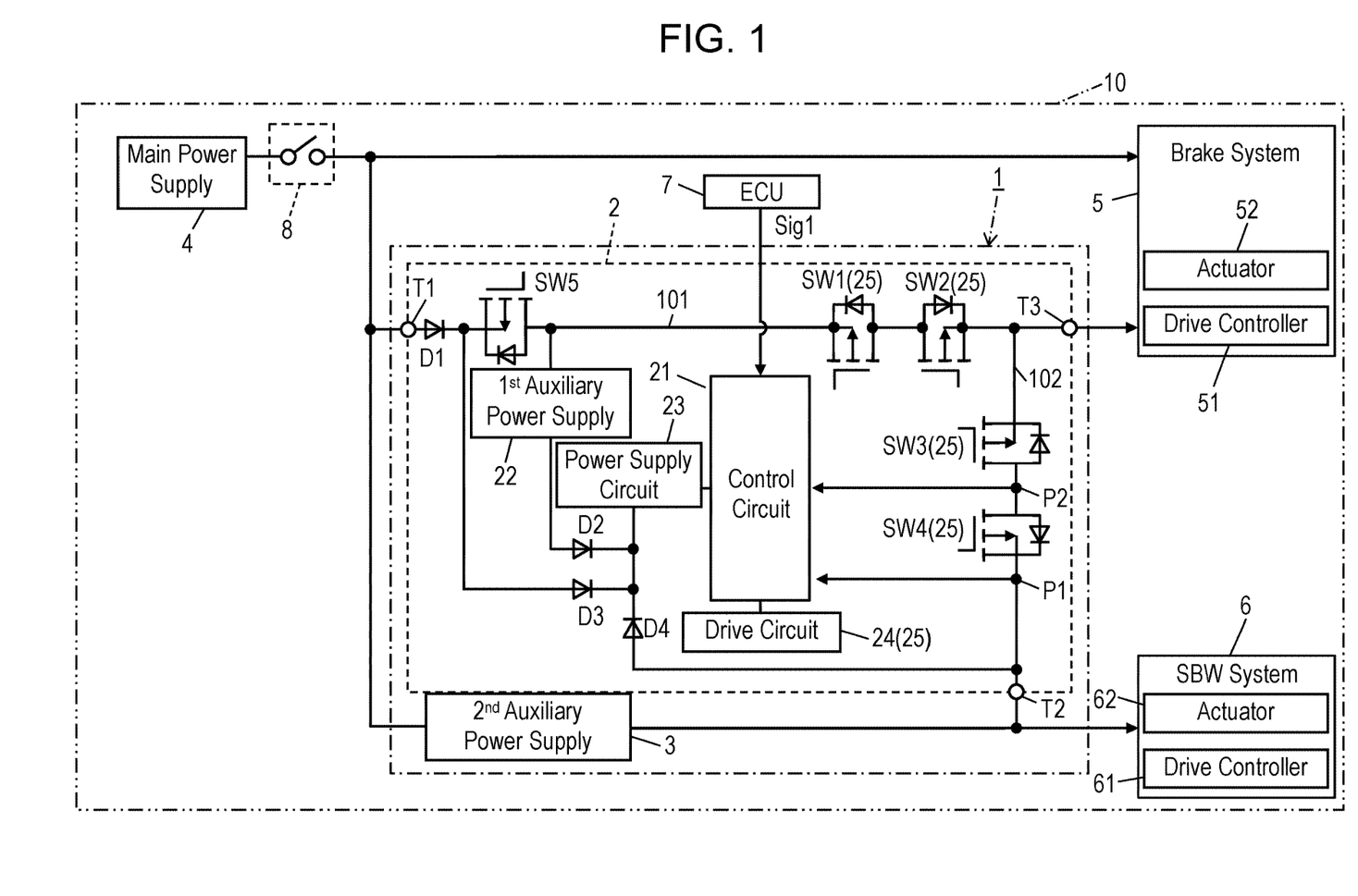
FIG. 1 is a diagram showing of a drive system including a backup power supply system according to an exemplary embodiment.

Backup power supply system 1 according to the embodiment includes, as shown in FIG. 1, backup power supply device 2 and second auxiliary power supply 3.

Backup power supply device 2 includes control circuit 21, first auxiliary power supply 22, power supply circuit 23, drive circuit 24, plural (five in FIG. 1) switches SW1 to SW5, and plural (four in FIG. 1) diodes D1 to D4. Backup power supply device 2 further includes plural (two in FIG. 1) input terminals T1 and T2, and one output terminal T3. That is to say, in backup power supply system 1 according to the embodiment, first auxiliary power supply 22 and second auxiliary power supply 3 are provided separately from each other.

(2.1) Terminals

Input terminal T1 is coupled to main power supply 4 via ignition switch 8. Input terminal T1 is a terminal for inputting electric power supplied from main power supply 4 to backup power supply device 2 when ignition switch 8 is on.

Input terminal T2 is coupled to second auxiliary power supply 3. Input terminal T2 is a terminal for inputting electric power supplied from second auxiliary power supply 3 to backup power supply device 2.

Output terminal T3 is configured to be connected to brake system 5. Output terminal T3 is a terminal for outputting electric power supplied from first auxiliary power supply 22 or second auxiliary power supply 3 to brake system 5.

Main power supply 4 is coupled to brake system 5 via ignition switch 8. When main power supply 4 is normal and ignition switch 8 is turned on, electric power is supplied to brake system 5 also from main power supply 4.

(2.2) Control Circuit

Control circuit 21 is implemented by, for example, a microcomputer including a processor and a memory. That is to say, control circuit 21 is implemented by a computer system including a processor and a memory. Then, when the processor executes an appropriate program, the computer system functions as control circuit 21. The program may be previously stored in the memory, or may be provided through a telecommunications line, such as the Internet, or stored in a non-temporary recording medium, such as a memory card.

Control circuit 21 is configured to control at least drive circuit 24. Control circuit 21 configured to output, 5 to drive circuit 24, first to fifth control signals for controlling turning on and off of switches SW1 to SW. Drive circuit 24 is configured to control turning on and off of switches SW1 to SW5 in response to the first to fifth control signals from control circuit 21.

Control circuit 21 has a function of diagnosing fault of second auxiliary power supply 3. Specifically, control circuit 21 has a first function and a second function. The first function is a function of determining whether second auxiliary power supply 3 is normal or not. The second function is a function of determining whether switches SW3 and SW4 provided on second feed line 102 from second auxiliary power supply 3 to brake system 5 are normal or not.

Control circuit 21 is configured to measure, in the first function, a voltage at first node P1 between switch SW4 and input terminal T2 to which second auxiliary power supply 3 is connected. Control circuit 21 is configured to determine that second auxiliary power supply 3 is normal when the voltage at the first node P1 is equal to or higher than the first voltage, and to determine that second auxiliary power supply 3 is not normal when the voltage of the first node P1 is lower than the first voltage.

Control circuit 21 is configured to measure, in the second function, a voltage at second node P2 between switch SW3 and switch SW4 so as to detect short circuit and release (open) of switches SW3 and SW4.

(2.3) Auxiliary Power Supplies

First auxiliary power supply 22 and second auxiliary power supply 3 are power supplies (that is, auxiliary or preliminary power supplies) for backing up main power supply 4. In other words, first auxiliary power supply 22 and second auxiliary power supply 3 are auxiliary power supplies capable of supplying electric power to first load 5 when failure of main power supply 4 occurs.

Each of first auxiliary power supply 22 and second auxiliary power supply 3 may be implemented by, for example, an electric double layer capacitor (EDLC). Each of the first auxiliary power supply 22 and second auxiliary power supply 3 may be a secondary battery, such as a lithium ion capacitor (LIC) or a lithium ion battery (LIB). In the lithium ion capacitor, a positive electrode is made of the same material (for example, activated carbon) as that for EDLC, and a negative electrode is made of the same material (for example, carbon material, such as graphite) as that for LIB.

Each of first auxiliary power supply 22 and second auxiliary power supply 3 may not necessarily limited to the electric double layer capacitor, and may be, for example, an electrochemical device having the following configuration. The electrochemical device includes a positive electrode, a negative electrode, and a nonaqueous electrolyte. The positive electrode includes a positive current collector and a positive electrode material layer which is supported by the positive current collector and which contains positive electrode active material. The positive electrode material layer contain conductive polymer as positive electrode active material for doping and de-doping anions (dopants). The negative electrode includes a negative electrode material layer containing negative electrode active material. As an example, the negative electrode active material may be a material in which a redox reaction accompanied by the absorption and release of lithium ions progresses, and specifically, it is carbon material, metal compound, alloy, ceramic material, or the like. The nonaqueous electrolyte has lithium ion conductivity as an example. This type of the nonaqueous electrolyte contains lithium salt and nonaqueous dissolving the lithium salt. An electrochemical device having such a configuration has a higher energy density than an electric double layer capacitor.

Each of first auxiliary power supply 22 and second auxiliary power supply 3 may include two or more power storage devices (for example, electric double layer capacitors) electrically connected in parallel or in series to one another. That is to say, each of single first auxiliary power supply 22 and single second auxiliary power supply 3 may be implemented by a parallel circuit of two or more storage devices, a serial circuit of two or more storage devices, or a combination thereof.

In backup power supply system 1 according to the embodiment, electrostatic capacitance of second auxiliary power supply 3 is smaller than that of first auxiliary power supply 22. Therefore, when first auxiliary power supply 22 and second auxiliary power supply 3 are charged simultaneously, the second duration that is a duration of charging the second auxiliary power supply 3 is shorter than the first duration that is a duration of charging the first auxiliary power supply 22. In other words, the second duration until second auxiliary power supply 3 becomes capable of supplying electric power to first load 5 is shorter the first duration until first auxiliary power supply 22 becomes capable of supplying electric power to first load 5.

In backup power supply system 1 according to the embodiment, second auxiliary power supply 3 is configured to supply electric power to both first load 5 and second load 6. Therefore, second auxiliary power supply 3 has a capacity (electrostatic capacitance) capable of supplying electric power to both first load 5 and second load 6.

In backup power supply system 1 according to the embodiment, first auxiliary power supply 22 and second auxiliary power supply 3 are charged with electric power supplied from main power supply 4. Specifically, first auxiliary power supply 22 is supplied with electric power from main power supply 4 when ignition switch 8 and switch SW5 are turned on, and this electric power is used for charging. Electric power is supplied to second auxiliary power supply 3 from main power supply 4 when ignition switch 8 is turned on, and this electric power is used for charging. First auxiliary power supply 22 and second auxiliary power supply 3 are configured to be discharged when ignition switch 8 is turned off. When ignition switch 8 is turned on again, first auxiliary power supply 22 and second auxiliary power supply 3 are in an uncharged state. The "uncharged state" denoted in the present disclosure refers to as a state in which a residual amount of electric energy is smaller than a full charge, that is, a state in which electrical energy is sufficiently stored.

(2.4) Power Supply Circuit

Power supply circuit 23 is configured to generate an operation voltage powering control circuit 21. Power supply circuit 23 is configured to step down an output voltage of main power supply 4 input via the input terminal T1 and the diodes D1 and D3 thereto to a predetermined voltage (for example, 5 V), and outputs the stepped-down voltage to control circuit 21. Power supply circuit 23 is configured to step down the output voltage of first auxiliary power supply 22 which is input via the diode D2 thereto to a predetermined voltage (for example, 5 V), and outputs the stepped-down voltage to control circuit 21. In addition, power supply circuit 23 is configured to step down the output voltage of second auxiliary power supply 3 which is input via the diode D4 thereto to a predetermined voltage (for example, 5 V), and outputs the stepped-down voltage to control circuit 21. Control circuit 21 becomes operable with the output electric power of power supply circuit 23.

(2.5) Drive Circuit

Drive circuit 24 is configured to control plural switches SW1 to SW5 individually. Drive circuit 24 generates first to fifth drive signals for turning on and off switches SW1 to SW5 in response to the first to fifth control signals from control circuit 21, and outputs the first to fifth drive signals to switches SW1 to SW5. Switches SW1 to SW5 are turned on and off in response to the first to fifth drive signals from drive circuit 24.

(2.6) Switch

Each of switches SW1 to SW5 is implemented by, for example, an enhancement type P-channel metal oxide semiconductor field effect transistor (MOSFET). Switches SW1 to SW5 are turned on and off in response to the first to fifth drive signals output from drive circuit 24.

Switches SW1 and SW2 are provided between first auxiliary power supply 22 and output terminal T3 on first feed line 101 connecting input terminal T1 to output terminal T3. Switches SW1 and SW2 are connected in series to each other on first feed line 101. The source of switch SW1 is coupled to first auxiliary power supply 22, and the drain of switch SW1 is coupled to the drain of switch SW2. The source of switch SW2 is coupled to output terminal T3. When both switches SW1 and SW2 are turned on, electric power stored in first auxiliary power supply 22 is supplied to brake system 5 via switches SW1 and SW2.

Switches SW3 and SW4 are provided on second feed line 102 connecting input terminal T2 and output terminal T3. Switches SW3 and SW4 are connected in series to each other on second feed line 102. The source of switch SW4 is coupled to input terminal T2, the drain of switch SW4 is coupled to the drain of switch SW3. The source of switch SW3 is coupled to output terminal T3. When both switches SW3 and SW4 are tuned on, the electric power stored in second auxiliary power supply 3 may be supplied to brake system 5 via switches SW3 and SW4.

Backup power supply system 1 according to the embodiment is configured to supply electric power to brake system 5 from one auxiliary power supply of first auxiliary power supply 22 and second auxiliary power supply 3. Therefore, when switches SW1 and SW2 are turned on and electric power is supplied from first auxiliary power supply 22 to brake system 5, switches SW3 and SW4 are turned off to stop supplying electric power from second auxiliary power supply 3. When switches SW3 and SW4 are turned on to supply electric power from second auxiliary power supply 3 to brake system 5, switches SW1 and SW2 are turned off to stop supplying electric power from first auxiliary power supply 22.

In backup power supply system 1 according to the embodiment, switches SW1 to SW4 and drive circuit 24 constitute switching circuit 25. That is to say, backup power supply system 1 according to the embodiment further includes switching circuit 25 configured to switch between a state in which first auxiliary power supply 22 supplies electric power to first load 5 and a state in which second auxiliary power supply 3 supplies electric power to first load 5.

Switch SW5 is provided between input terminal T1 and first auxiliary power supply 22 on first feed line 101 connecting input terminal T1 to output terminal T3. The source of switch SW5 is coupled to input terminal T1 via diode D1, and the drain of switch SW5 is coupled to first auxiliary power supply 22. In backup power supply system 1 according to the embodiment, when ignition switch 8 is turned on and switch SW5 is turned on, first auxiliary power supply 22 is charged. Therefore, even when ignition switch 8 is turned on, switch SW5 is turned off to prevent first auxiliary power supply 22 from being charged.

(2.7) Diode

Diode D1 is provided between input terminal T1 and switch SW5 on first feed line 101 connecting input terminal T1 to output terminal T3. The anode of diode D1 is coupled to input terminal T1, and the cathode of diode D1 is coupled to the source of switch SW5.

Diode D2 is provided between first auxiliary power supply 22 and power supply circuit 23. The anode of diode D2 is coupled to first auxiliary power supply 22, and the cathode of diode D2 is coupled to power supply circuit 23.

Diode D3 is provided between power supply circuit 23 and a node at which diode D1 is connected to switch SW5. The anode of diode D3 is coupled to the node at which diode D1 is connected to switch SW5, and the cathode of diode D3 is coupled to power supply circuit 23.

Diode D4 is provided between input terminal T2 and power supply circuit 23. The anode of diode D4 is coupled to input terminal T2, and the cathode of diode D4 is coupled to power supply circuit 23.

When the output voltage of main power supply 4 is higher than the output voltage of first auxiliary power supply 22 and second auxiliary power supply 3, diodes D1 and D3 are conductive and diodes D2 and D4 are not conductive, thereby inputting an output voltage of main power supply 4 to power supply circuit 23 through diodes D1 and D3. Then, power supply circuit 23 steps down the output voltage that has been input from main power supply 4 thereto to a predetermined voltage (for example, 5 V), and outputs the stepped-down voltage to control circuit 21.

When the output voltage of first auxiliary power supply 22 is higher than the output voltage of main power supply 4 and second auxiliary power supply 3, diode D2 becomes conductive and diodes D1, D3 and D4 do not become conductive, thereby inputting the output voltage of the first auxiliary power supply 22 into power supply circuit 23 through diode D2. Then, power supply circuit 23 steps down the output voltage input from input first auxiliary power supply 22 thereto to a predetermined voltage (for example, 5 V), and outputs the stepped-down voltage to control circuit 21.

When the output voltage of second auxiliary power supply 3 is higher than the output voltage of main power supply 4 and first auxiliary power supply 22, diode D4 becomes conductive and diodes D1, D2 and D3 become non-conductive, thereby inputting the output voltage of the second auxiliary power supply 3 is input into power supply circuit 23 through diode D4. Then, power supply circuit 23 steps down the output voltage input from second auxiliary power supply 3 thereto to a predetermined voltage (for example, 5 V), and outputs the stepped-down voltage to control circuit 21.

(3) OPERATION

Figure 3:
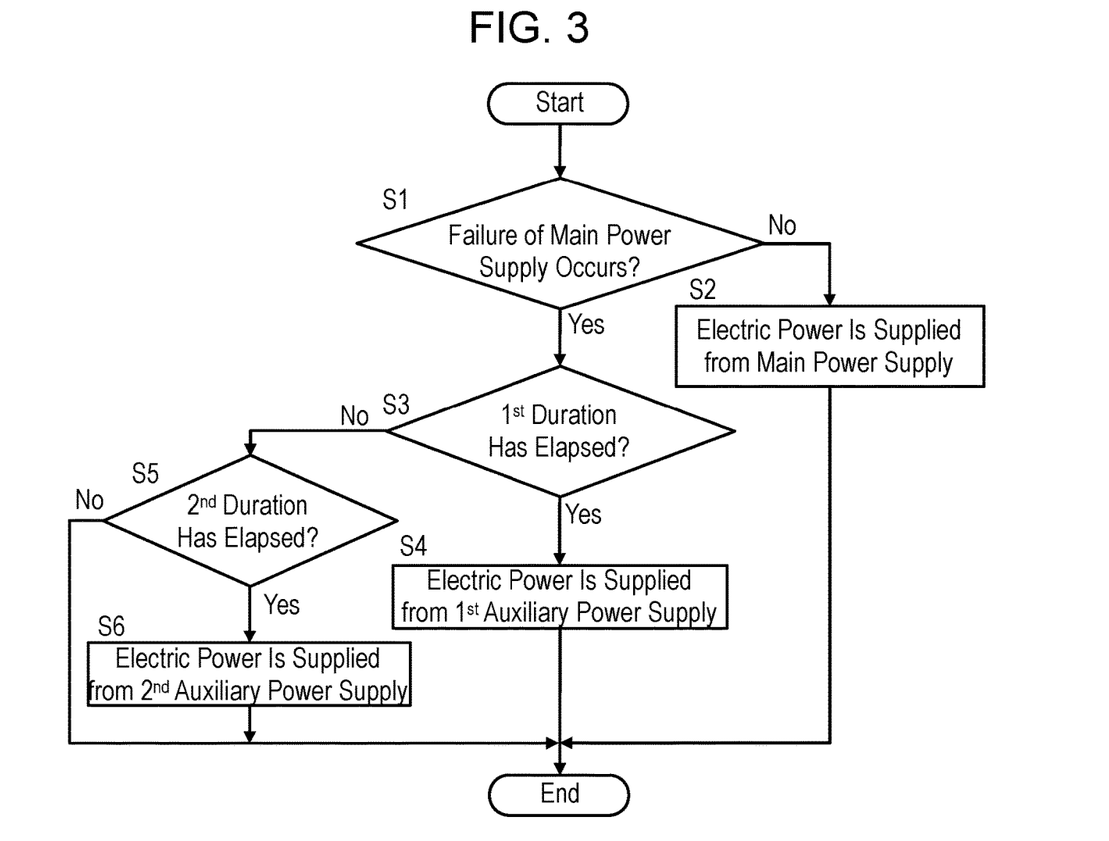
FIG. 3 is a flowchart showing operation example 1 of the backup power supply system.

An operation of backup power supply system 1 according to the embodiment will be described below with reference to FIGS. 3 and 4.

(3.1) Operation Example 1

Operation example 1 of backup power supply system 1 will be described with reference to FIG. 3. An operation of supplying electric power to first load 5 from main power supply 4 or backup power supply system 1 will be described below. Ignition switch 8 and switch SW5 are previously turned on.

When failure of main power supply 4 does not occur, that is, when main power supply 4 is normal (step S1: No), electric power is supplied from main power supply 4 to first load 5 (step S2). Control circuit 21 is configured to determine whether failure of main power supply 4 occurs or not preferably by measuring, for example, an output voltage of main power supply 4.

When failure of main power supply 4 occurs (step S1: Yes), control circuit 21 determines whether or not a first duration has elapsed since charging of first auxiliary power supply 22 and second auxiliary power supply 3 started (step S3). When the first duration has elapsed (step S3: Yes), control circuit 21 turns on switches SW1 and SW2, and turns off switches SW3 and SW4 so as to supply electric power from first auxiliary power supply 22 to first load 5 (step S4). On the other hand, when the first duration has not elapsed (step S3: No), control circuit 21 determines whether the second duration has elapsed or not (step S5). In this case, since the first duration has not elapsed, first auxiliary power supply 22 is not charged enough to supply electric power to first load 5.

When the second duration has elapsed (step S5: Yes), control circuit 21 turns on switches SW3 and SW4 and turns off switches SW1 and SW2 to supply electric power from second auxiliary power supply 3 to first load 5 (step S6). On the other hand, when the second duration has not elapsed (step S5: No), control circuit 21 turns off switches SW1 to SW4 so as not to supply electric power from first auxiliary power supply 22 or second auxiliary power supply 3.

When the first duration has elapsed while electric power is supplied from main power supply 4 to first load 5 in addition to supplying electric power from main power supply 4 to first load 5, electric power may be supplied from first auxiliary power supply 22 to first load 5. When the second duration has elapsed while electric power is supplied from main power supply 4 to first load 5 in addition to supplying electric power from main power supply 4 to first load 5, electric power may be supplied from second auxiliary power supply 3 to first load 5.

In backup power supply system 1 according to the embodiment, the second duration until second auxiliary power supply 3 becomes capable of supplying electric power to first load 5 is shorter than the first duration until first auxiliary power supply 22 becomes capable of supplying electric power to first load 5. Therefore, in the period until the first duration has elapsed, second auxiliary power supply 3 may supply electric power to first load 5. Thus, it is advantageous that as compared with the case where electric power is supplied to first load 5 by only first auxiliary power supply 22 when failure of main power supply 4 occurs, a state in which no power is supplied to first load 5 is less likely to occur when failure of main power supply 4 occurs.

(3.2) Operation Example 2

Operation example 2 of backup power supply system 1 will be described below with reference to FIG. 4. The reference symbol "F1" shown in FIG. 4 denotes an output flag showing an output state of second auxiliary power supply 3, and the reference symbol "F2" shown in FIG. 4 denotes a request flag requesting output from second auxiliary power supply 3. The reference symbol "F3" shown in FIG. 4 denotes a permission flag indicating whether or not a remote parking is permitted. The reference symbol "F4" shown in FIG. 4 denotes a prohibition flag showing whether or not remote parking is prohibited. The reference symbol "F5" shown in FIG. 4 denotes a charge permission flag showing whether or not charging to first auxiliary power supply 22 is permitted. In the following description, failure of main power supply 4 does not occur.

A case where vehicle 9 automatically leave a parking lot by remote parking (remote control parking) will be described below as an example. In this case, it is necessary to supply electric power to brake system 5 in order to stop vehicle 9 that has left the parking lot.

In remote parking, since brake system 5 stops vehicle 9 traveling at a speed of, e.g. several km per hour, the power consumption of brake system 5 is smaller than that in stopping vehicle 9 traveling at a speed of several tens km/per hour. Therefore, in remote parking, vehicle 9 can be stopped even by second auxiliary power supply 3 having an electrostatic capacitance smaller than that of first auxiliary power supply 22. On the other hand, when vehicle 9 running at a speed of several tens km per hour is stopped, electric power is supplied to brake system 5 from first auxiliary power supply 22 having an electrostatic capacitance larger than second auxiliary power supply 3. That is to say, in backup power supply system 1 according to the embodiment, second auxiliary power supply 3 supplies electric power to first load 5 in a second state in which power consumption of first load 5 is smaller than in a first state in which first auxiliary power supply 22 supplies electric power to first load (brake system) 5.

A user (a driver or a passenger) of vehicle 9 instructs ECU 7 of vehicle 9 of remote parking with, e.g. a dedicated remote control. When ECU 7 is not instructed of remote parking to ECU 7, ignition switch 8 is turned off. Therefore, in this case, power is supplied from main power supply 4 to none of first auxiliary power supply 22 and second auxiliary power supply 3, and first auxiliary power supply 22 and second auxiliary power supply 3 are not charged. When ignition switch 8 is turned off, since electric power stored in first auxiliary power supply 22 and second auxiliary power supply 3 is discharged, first auxiliary power supply 22 and second auxiliary power supply 3 are in an uncharged state.

Upon being instructed of remote parking, ECU 7 turns on ignition switch 8 to start charging second auxiliary power supply 3. When ignition switch 8 is turned on, electric power is supplied from main power supply 4 to power supply circuit 23, and control circuit 21 is started by the output power of power supply circuit 23. At this moment, permission flag F3 is turned off, and remote parking cannot be carried out. At this moment, all of switches SW1 to SW5 are turned off. In this state, first auxiliary power supply 22 is not charged, and only second auxiliary power supply 3 is charged. That is to say, second auxiliary power supply 3 is charged with electric power supplied from main power supply 4 prior to first auxiliary power supply 22. ECU 7 outputs a request signal (particular signal) Sig1 requesting control circuit 21 to execute remote parking. Upon receiving request signal Sig1 from ECU 7, control circuit 21 executes the following various processes for executing remote parking. In the embodiment, ECU 7 of vehicle 9 is an external system.

Before time point t1, control circuit 21 detects short circuit of switches SW2 and SW3 as follows. While turning off switches SW1 to SW4, control circuit 21 measures a voltage at the third node between switches SW1 and SW2 so as to detect short circuit of switch SW2; and measures a voltage at second node P2 between switches SW3 and SW4 so as to detect short circuit of switch SW3. At time point t1, control circuit 21 turns on switch SW3 and measures a voltage between switches SW3 and SW4 to detect open of switch SW3. At time point t2, control circuit 21 turns off switch SW3.

When switch SW3 is not short-circuited and not open, control circuit 21 turns on request flag F2 at time point t2. Control circuit 21 measures a voltage at first node P1. When the measured voltage is a first voltage or more, control circuit 21 determines that the electric power is output from second auxiliary power supply 3. Then, control circuit 21 turns on output flag F1 (see FIG. 4). At this moment, since switches SW3 and SW4 are turned off, output electric power of second auxiliary power supply 3 is supplied to shift-by-wire system 6, but not to brake system 5.

In a period from time point t2 to time point t3, control circuit 21 detects short circuit (short) of switch SW4 as follows. While state in which switches SW3 and SW4 are off, control circuit 21 measures a voltage at second node P2 between SW3 and SW4 and detects a short circuit of switch SW4. When switch SW4 is not short-circuited, control circuit 21 turns on switch SW4 to detect release (open) of switch SW4. Control circuit 21 measures a voltage of second node P2 between switches SW3 and SW4 to detect open of switch SW4.

When switch SW4 is not short-circuited or open, control circuit 21 turns on switch SW3 at time point t4. At this moment, control circuit 21 turns off request flag F2. Also at this moment, since both switches SW3 and SW4 are turned on, output electric power of second auxiliary power supply 3 is supplied to both brake system 5 and shift-by-wire system 6.

Since second auxiliary power supply 3 is capable of supplying electric power to brake system (first load) 5 and remote parking may be carried out, control circuit 21 turns on permission flag F3, and outputs a permission signal to ECU 7. Upon receiving the permission signal from control circuit 21, ECU 7 transmits an operable signal to the above-mentioned remote control, showing that the remote parking can be carried out. When a user carries out a particular operation (an operation for executing remote parking) to the above-mentioned remote control having received the operable signal, the remote parking is started.

At time point t5, control circuit 21 turns on charge permission flag F5 and turns on switch SW5 to start charging first auxiliary power supply 22.

At time point t6, since an output voltage of second auxiliary power supply 3 is equal to or lower than the first voltage, control circuit 21 turns off output flag F1. At time point t7, since the output voltage of second auxiliary power supply 3 is equal to or lower than the first voltage and electric power cannot be supplied to brake system 5, control circuit 21 turns off permission flag F3. At time point t8, control circuit 21 turns on prohibition flag F4 when permission flag F3 which has been trued on is turned off. At time point t9, control circuit 21 turns off switches SW3 and SW4, and stops supplying electric power from second auxiliary power supply 3 to brake system 5.

In a period from time point t9 to time point t10, control circuit 21 detects short circuit (short) of switch SW1 as follows. Control circuit 21 measures a voltage at the third node between switches SW1 and SW2 while switches SW1 and SW2 are turned off so as to detect short circuit of switch SW1. Control circuit 21 detects release (open) of switches SW1 and SW2 as follows when switches SW1 and SW2 are not short-circuited. Control circuit 21 turns on switches SW1 and SW2 at time point t10, and measures a voltage of the third node between switches SW1 and SW2 to detect open of switches SW1 and SW2.

At time point t11, control circuit 21 turns off switches SW1 and SW2 and turns on switches SW3 and SW4. After that, at time point t12, since the output voltage of second auxiliary power supply 3 is equal to or higher than the first voltage, and is capable of supplying electric power to brake system 5, control circuit 21 turns on output flag F1 and turns on permission flag F3.

At time point t13, since charging of first auxiliary power supply 22 is completed, control circuit 21 turns off switches SW3 and SW4 so as to stop supplying electric power from second auxiliary power supply 3 to brake system 5. Thus, the supplying of electric power from second auxiliary power supply 3 to brake system 5 is stopped. Then, after time point t13, since first auxiliary power supply 22 is capable of supplying electric power to brake system 5, control circuit 21 turns on switches SW1 and SW2 so as to supply electric power from first auxiliary power supply 22 to brake system 5.

Backup power supply system 1 according to the embodiment allows remote parking to be executed with electric power from second auxiliary power supply 3 in the period from time point t4 to time point t6 and the period from time point t12 to time point t13 in which switches SW3 and SW4 are turned on and output flag F1 is turned on.

In backup power supply system 1 according to the embodiment, the second duration until second auxiliary power supply 3 becomes capable of supplying electric power to first load 5 is shorter than the first duration until first auxiliary power supply 22 becomes capable of supplying electric power to first load 5. Therefore, in the period until the first duration has elapsed, second auxiliary power supply 3 may supply electric power to first load 5. Thus, it is advantageous that as compared with the case where only first auxiliary power supply 22 supplies electric power to first load 5 when failure of main power supply 4 occurs, a state in which no power is supplied to first load 5 is less likely to occur when failure of main power supply 4 occurs.

Backup power supply system 1 according to the embodiment configured to charge second auxiliary power supply 3 prior to the first one allows charging duration of second auxiliary power supply 3 to be shorter than the system where first auxiliary power supply 22 and second auxiliary power supply 3 are charged simultaneously.

In backup power supply system 1 according to the embodiment, upon receiving a request signal (particular signal) Sig1 input from ECU 7 as an external system, control circuit 21 outputs, to ECU 7, an indication showing that second auxiliary power supply 3 is in a power-suppliable state, that is, outputs a permission signal, in which second auxiliary power supply 3 may supply electric power to first load 5. In particular, in a case where engine of vehicle 9 is started before remote parking is instructed by the remote control, the second auxiliary power supply 3 can be charged in a period from the start of the engine of vehicle 9 to the instruction of remote parking. Therefore, the supplying of electric power to first load 5 can be started at an earlier timing than the case where second auxiliary power supply 3 is in the power-suppliable state after the request signal Sig1 from the ECU 7 is received. The "power-suppliable state" in the present disclosure includes a case where second auxiliary power supply 3 is charged and is capable of supplying electric power to first load 5 and a case where second auxiliary power supply 3 is normal and switches SW3 and SW4 are normal (that is, second power supply path 102 from second auxiliary power supply 3 to first load 5 is normal).

(4) MODIFICATION EXAMPLE

The above-described embodiment is just one of various exemplary embodiments of the present disclosure. The above-described exemplary embodiment can be modified variously according to designs and the like as long as the object of the present disclosure can be achieved. Furthermore, functions similar to those of the above-described backup power supply system 1 according to the embodiment may be performed by a power supply backup method, a computer program, or a non-temporary recording medium recording a computer program, and the like.

A power supply backup method according to an aspect is used for backup power supply system 1. Backup power supply system 1 includes first auxiliary power supply 22 and second auxiliary power supply 3 capable of supplying electric power to first load (load) 5 when failure of main power supply 4 occurs. In the power supply backup method, the second duration is shorter than the first duration. The first duration is the duration until first auxiliary power supply 22 becomes capable of supplying electric power to first load 5. The second duration is the duration until second auxiliary power supply 3 becomes capable of supplying electric power to first load 5. A program according to one embodiment is a program executable by one or more processors to execute the above-described power supply backup method.

Modification examples of the above-described exemplary embodiment will be described below. The following modification examples can be applied appropriately in combination.

In backup power supply system 1 in accordance with the present disclosure, control circuit 21 includes a computer system. The computer system mainly includes a processor and a memory as hardware. When executing a program stored in the memory of the computer system, the processor performs a function of control circuit 21 of the present disclosure. The program may be previously stored in the memory of the computer system, or may be provided via a telecommunications line, or may be provided in a form of a non-temporary recording medium, such as a memory card, an optical disk, or a hard disk drive, readable by a computer system. The processor of the computer system is implemented by one or more electronic circuits including a semiconductor integrated circuit (IC) or a large scale integrated circuit (LSI). The integrated circuits such as IC or LSI herein denoted are called differently depending on the degree of integration, and include integrated circuits called system LSI, VLSI (Very Large Scale Integration), or VLSI (Ultra Large Scale Integration). Furthermore, an FPGA (field-programmable gate array), or a logic device capable of reconstructing junctions inside the LSI or reconstructing circuit sections inside the LSI programmed after the LSI is manufactured can also be employed as a processor. The plurality of electronic circuits may be integrated into one chip, or may be distributed in a plurality of chips. A plurality of chips may be integrated into one device, and may be distributed in a plurality of devices. The computer systems herein denoted include a micro-controller having one or more processors and one or more memories. Therefore, the micro-controller is also configured by one or a plurality of electronic circuits including a semiconductor integrated circuit or a large scale integrated circuit.

Plural functions of backup power supply system 1 is integrated in one housing, but this configuration is not essential configuration of backup power supply system 1. That is to say, component elements of backup power supply system 1 may be dispersed and provided in plural housings. In addition, at least a part of functions of backup power supply system 1, for example, a function of control circuit 21 may be achieved by cloud (cloud computing), and the like.

(4.1) Modification Example 1

Figure 5:
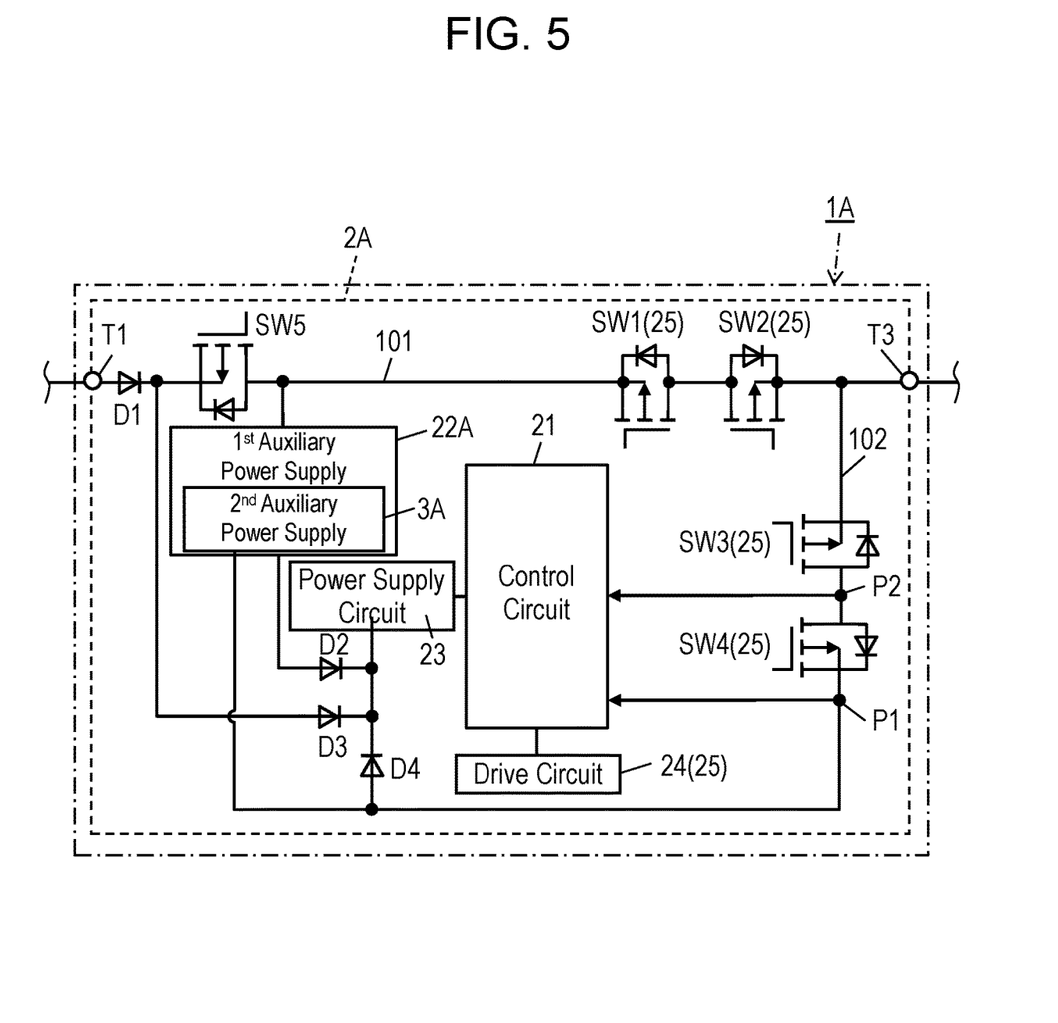
FIG. 5 illustrates a backup power supply system according to modification example 1.

In the above-described exemplary embodiment, first auxiliary power supply 22 and second auxiliary power supply 3 are provided separately from each other. As shown in FIG. 5, however, second auxiliary power supply 3A may be included in first auxiliary power supply 22A. That is to say, second auxiliary power supply 3A may be implemented by a part of first auxiliary power supply 22A. Backup power supply system 1A according to modification example 1 will be described below with reference to FIG. 5. Components identical to those of the above-described backup power supply system 1 according to the embodiment are denoted by the same reference numerals, and their description may be omitted.

Figure 4:
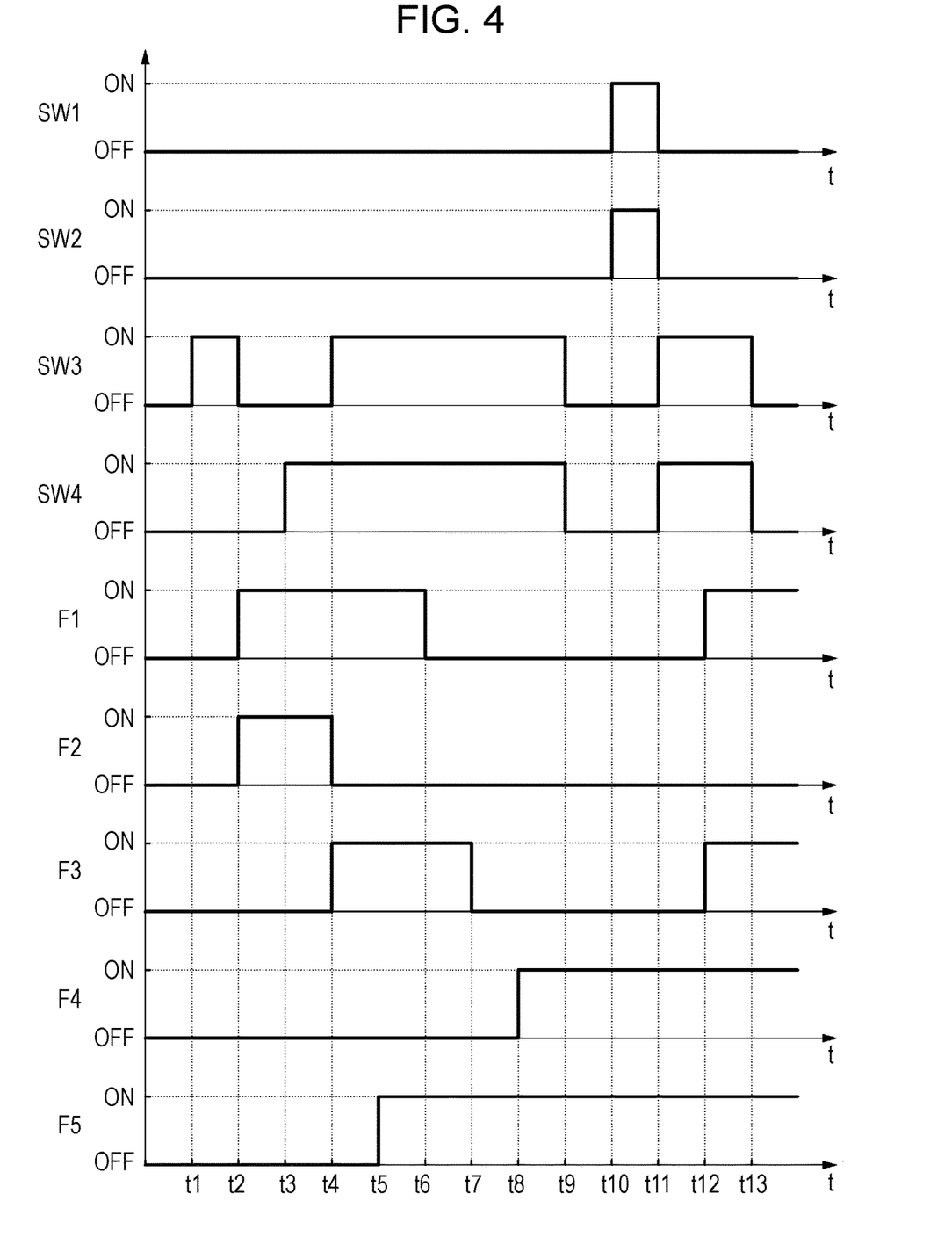
FIG. 4 is a time-chart showing operation example 2 of the backup power supply system.

Backup power supply system 1A according to modification example 1 includes backup power supply device 2A, as shown in FIG. 4.

Backup power supply device 2A includes control circuit 21, first auxiliary power supply 22A, power supply circuit 23, drive circuit 24, plural (five in FIG. 5) switches SW1 to SW5, and plural (four in FIG. 5) diodes D1 to D4. Backup power supply device 2A further includes plural (two in FIG. 5) input terminals T1 and T2 and one output terminal T3. Configurations other than first auxiliary power supply 22A are the same as those of the backup power supply system 1 according to the embodiment described above, and their description may be omitted.

First auxiliary power supply 22A includes a series circuit including, for example, five electric double layer capacitors connected in series to one another between first feed line 101 and the ground. Second auxiliary power supply 3A is constituted by an electric double layer capacitor connected to a position closest to the ground among five electric double layer capacitors constituting first auxiliary power supply 22A. That is to say, in backup power supply system 1A according to modification example 1, first auxiliary power supply 22A includes second auxiliary power supply 3A. In first auxiliary power supply 22A, the five electric double layer capacitors are sequentially charged from the electric double layer capacitor connected to the position closest to the ground among the five capacitors, so that second auxiliary power supply 3A can be charged prior to the first power supply.

As described above, backup power supply system 1A according to modification example 1 is configured to charge second auxiliary power supply 3A prior to the first power supply. Therefore, even in the period until first auxiliary power supply 22A is charged, second auxiliary power supply 3A can supply electric power to first load 5. Therefore, as compared with the case where only first auxiliary power supply 22A supplies electric power to first load 5, when failure of main power supply 4 occurs, it is advantageous that a state in which no power is supplied to first load 5 is less likely to occur when failure of main power supply 4 occurs.

(4.2) Other Modification Examples

Other modification examples of the above-described exemplary embodiment will be described below.

In the exemplary embodiment described above, second auxiliary power supply 3 is charged prior to first auxiliary power supply 22 with electric power supplied from main power supply 4. However, first auxiliary power supply 22 and second auxiliary power supply 3 may be charged simultaneously. In this case, for example, when switch SW5 is turned on at timing at which control circuit 21 starts, first auxiliary power supply 22 and second auxiliary power supply 3 may be charged simultaneously.

In the above-described exemplary embodiment, switching circuit 25 is configured to switch between a state in which electric power is supplied from first auxiliary power supply 22 to first load 5 and a state in which electric power is supplied from second auxiliary power supply 3 to first load 5. Both first auxiliary power supply 22 and second auxiliary power supply 3 may supply electric power to first load 5.

In the above-described embodiment, the second load is shift-by-wire system 6. However, the second load is not limited to shift-by-wire system 6, and may be, for example, a door lock system for locking a door of vehicle 9.

The above-described embodiment describes a case of performing remote parking with a remote control, but the remote parking may be performed with, for example, a smartphone, tablet, or the like, having downloaded a dedicated application.

In the above-described embodiment, upon receiving a request signal Sig1 from ECU 7, control circuit 21 outputs, to ECU 7, an indication showing that second auxiliary power supply 3 is in the power-suppliable state when second auxiliary power supply 3 is in the power-suppliable state. Meanwhile, the control circuit may instruct second auxiliary power supply 3 to be in a state capable of supplying electric power to first load 5 after receiving request signal Sig1 from ECU 7. Thus, second auxiliary power supply 3 is in the power-suppliable state in response to request signal Sig1 form ECU 7.

(Summary)

As described above, backup power supply system (1; 1A) according to a first aspect includes first auxiliary power supply (22; 22A) and second auxiliary power supply (3; 3A) capable of supplying electric power to load (5) when failure of main power supply (4) occurs. In backup power supply system (1; 1A), a second duration is shorter than a first duration. The first duration is the duration until first auxiliary power supply (22; 22A) becomes capable of supplying electric power to load (5). The second duration is the duration until second auxiliary power supply (3; 3A) becomes capable of supplying electric power to load (5).

According to this aspect, until first auxiliary power supply (22; 22A) becomes capable of supplying electric power to load (5), second auxiliary power supply (3; 3A) can supply electric power to load (5). Thus, it is advantageous that a state in which no power is supplied to first load (5) is less likely to occur when failure of main power supply (4) occurs as compared with the case where only first auxiliary power supply (22; 22A) supplies electric power to load (5) when failure of main power supply (4) occurs.

In backup power supply system (1; 1A) according to a second aspect, the first auxiliary power supply (22; 22A) and second auxiliary power supply (3; 3A) are configured to be charged with electric power supplied from main power supply (4) in the first aspect.

According to this aspect, first auxiliary power supply (22; 22A) and second auxiliary power supply (3; 3A) can be charged with electric power supplied from main power supply (4).

In backup power supply system (1; 1A) according to a third aspect, a capacity of second auxiliary power supply (3; 3A) is smaller than a capacity of first auxiliary power supply (22; 22A), in the first or second aspect.

According to this aspect, even when first auxiliary power supply (22; 22A) and second auxiliary power supply (3; 3A) are charged simultaneously, second auxiliary power supply (3; 3A) is charged in a shorter duration than first auxiliary power supply (22; 22A).

In backup power supply system (1; 1A) according to a fourth aspect, second auxiliary power supply (3; 3A) is configured to be charged with electric power supplied from main power supply (4) prior to first auxiliary power supply (22; 22A), in any one of the first to third aspects.

According to this aspect, second auxiliary power supply (3; 3A) can be charged in a shorter duration than the case where first auxiliary power supply (22; 22A) and second auxiliary power supply (3; 3A) are charged simultaneously.

In backup power supply system (1A) according to a fifth aspect, first auxiliary power supply (22A) includes second auxiliary power supply (3A), in any one of the first to fourth aspects.

According to this aspect, second auxiliary power supply (3A) may not be provided separately, so that increase in size of backup power supply system (1A) can be suppressed.

Backup power supply system (1; 1A) according to a sixth aspect is configured to be mounted on vehicle (9) including main power supply (4) and load (5) in any one of the first to fifth aspects.

According to this aspect, it is advantageous that a state in which no electric power is supplied to load (5) provided in vehicle (9) is less likely to occur when failure of main power supply (4) occurs.

In backup power supply system (1; 1A) according to a seventh aspect, second auxiliary power supply (3; 3A) can supply electric power to first load (5) and second load (6) other than first load (5) as a load in any one of the first to sixth aspects.

According to this aspect, both first load (5) and second load (6) can be supplied with electric power when failure of main power supply (4) occurs.

In backup power supply system (1; 1A) according to an eighth aspect, second auxiliary power supply (3; 3A) has at least a capacity capable of supplying electric power to both first load (5) and second load (6) in the seventh aspect.

According to this aspect, electric power may be supplied to both first load (5) and second load (6) when failure of main power supply (4) occurs.

In backup power supply system (1; 1A) according to a ninth aspect, second auxiliary power supply (3; 3A) is configured to supply electric power to load (5) in a second state in any one of the first to eighth aspect. In the second state, power consumption of load (5) is smaller than a first state in which first auxiliary power supply (22; 22A) supplies electric power to load (5).

According to this aspect, in the second state, load (5) can be operated with electric power supplied from second auxiliary power supply (3; 3A).

Backup power supply system (1; 1A) according to a tenth aspect further includes switching circuit (25) in any one of the first to ninth aspects. Switching circuit (25) is configured to switch between a state in which first auxiliary power supply (22; 22A) supplies electric power to load (5) and a state in which second auxiliary power supply (3; 3A) supplies electric power to load (5).

According to this aspect, the state in which first auxiliary power supply (22; 22A) supplies electric power to load (5) and the state in which a second auxiliary power supply (3; 3A) supplies electric power to load (5) can be switched from each other.

In a case where a particular signal (Sig1) from external system (7) is received, when second auxiliary power supply (3; 3A) is in a power-suppliable state, backup power supply system (1; 1A) according to an eleventh aspect is configured to output, to external system (13), an indication showing the fact that second auxiliary power supply (3; 3A) is in the power-suppliable state in any one of the first to tenth aspects. The power-suppliable state is a state in which second auxiliary power supply (3; 3A) is capable of supplying electric power to load (5).

According to this aspect, feeding electric power to load (5) can be started at earlier timing than the case where second auxiliary power supply (3; 3A) is in the power-suppliable state after the particular signal (Sig1) is received from external system (7).

In backup power supply system (1; 1A) according to a twelfth aspect, second auxiliary power supply (3; 3A) is configured to become capable of supplying electric power to load (5) after the particular signal (Sig1) is input from external system (7) in any one of the first to tenth aspects.

According to this aspect, second auxiliary power supply (3; 3A) is configured to become in the power-suppliable state in response to the particular signal (Sig1) input from external system (7).

Backup power supply system (1; 1A) according to a thirteenth aspect has a function of diagnosing fault of second auxiliary power supply (3; 3A) in any one of the first to twelfth aspects.

According to this aspect, fault diagnosis of second auxiliary power supply (3; 3A) can be performed.

A power supply backup method according to a fourteenth aspect is a power supply backup method to be used for backing up power supply system (1; 1A). Backup power supply system (1; 1A) includes first auxiliary power supply (22; 22A) and second auxiliary power supply (3; 3A) capable of supplying electric power to load (5) when failure of main power supply (4) occurs. In the power supply backup method, a second duration is shorter than a first duration. The first duration is the duration until first auxiliary power supply (22; 22A) becomes capable of supplying electric power to load (5). The second duration is the duration until second auxiliary power supply (3; 3A) becomes capable of supplying electric power to load (5).

According to this aspect, until first auxiliary power supply (22; 22A) becomes capable of supplying electric power to load (5), second auxiliary power supply (3; 3A) can supply electric power to load (5). Thus, it is advantageous that a state in which no power is supplied to first load (5) is less likely to occur when failure of main power supply (4) occurs as compared with the case where only first auxiliary power supply (22; 22A) supplies electric power to load (5) when failure of main power supply (4) occurs.

A program according to a fifteenth aspect is a program executable by one or more processors to execute the power supply backup method according to the fourteenth aspect.

According to this aspect, until first auxiliary power supply (22; 22A) becomes capable of supplying electric power to load (5), second auxiliary power supply (3; 3A) can supply electric power to load (5). Thus, it is advantageous that a state in which no power is supplied to first load (5) is less likely to occur when failure of main power supply (4) occurs as compared with the case where only first auxiliary power supply (22; 22A) supplies electric power to load (5) when failure of main power supply (4) occurs.

Configurations according to the second to thirteenth aspects are not essential configurations for backup power supply system (1; 1A) and appropriately omitted.

REFERENCE MARKS IN THE DRAWINGS 1, 1A backup power supply system
3, 3A second auxiliary power supply
4 main power supply
5 first load (load)
6 second load
7 ECU (external system)
9 vehicle
22, 22A first auxiliary power supply
25 switching circuit
Sig1 request signal (particular signal)

The invention claimed is:

1. A backup power supply system comprising
a first auxiliary power supply and a second auxiliary power supply configured to supply electric power to a load when failure of a main power supply occurs, wherein:
a second duration until the second auxiliary power supply becomes capable of supplying electric power to the load is shorter than a first duration until the first auxiliary power supply becomes capable of supplying electric power to the load,
the first duration is a duration until the first auxiliary power supply becomes capable of supplying electric power to the load since the first auxiliary power supply starts to be charged, and
the second duration is a duration until the second auxiliary power supply becomes capable of supplying electric power to the load since the second auxiliary power supply starts to be charged.

2. The backup power supply system according to claim 1, wherein the first auxiliary power supply and the second auxiliary power supply are configured to be charged with electric power supplied from the main power supply.

3. The backup power supply system according to claim 1, wherein a capacity of the second auxiliary power supply is smaller than a capacity of the first auxiliary power supply.

4. The backup power supply system according to claim 1, wherein the second auxiliary power supply is configured to be charged with electric power supplied from the main power supply prior to the first auxiliary power supply.

5. The backup power supply system according to claim 1, wherein the first auxiliary power supply includes the second auxiliary power supply.

6. The backup power supply system according to claim 1, wherein the backup power supply system is configured to be mounted on a vehicle including the main power supply and the load.

7. The backup power supply system according to claim 1, wherein the second auxiliary power supply is configured to supply electric power to both a first load as the load and a second load as a load other than the first load.

8. The backup power supply system according to claim 7, wherein the second auxiliary power supply has at least a capacity capable of supplying electric power to both the first load and the second load.

9. The backup power supply system according to claim 1, wherein the second auxiliary power supply is configured to supply electric power to the load in a second state that the load has smaller power consumption than a first state that the first auxiliary power supply supplies electric power to the load.

10. The backup power supply system according to claim 1, further comprising a switching circuit configured to switch between a state in which the first auxiliary power supply supplies electric power to the load and a state in which the second auxiliary power supply supplies electric power to the load.

11. The backup power supply system according to claim 1, wherein, upon receiving a particular signal input from an external system, the backup power supply system is configured to output, to the external system, an indication of a fact that the second auxiliary power supply is in a power-suppliable state in which the second auxiliary power supply is capable of supplying electric power to the load.

12. The backup power supply system according to claim 1, wherein, after receiving a particular signal input from an external system, the backup power supply system allows the second auxiliary power supply to supply electric power to the load.

13. The backup power supply system according to claim 1, wherein the backup power supply system has a function detecting fault of the second auxiliary power supply.

14. A power supply backup method to be used for a backup power supply system, the method comprising:
  causing a main power supply to supply electric power to a load while failure of the main power supply does not occur; and
  causing the backup power supply system to supply electric power to the load while failure of the main power supply occurs, wherein:
  the backup power supply system includes a first auxiliary power supply and a second auxiliary power supply which are capable of supplying electric power to the load, and
  a second duration until the second auxiliary power supply becomes capable of supplying electric power to the load is shorter than a first duration until the first auxiliary power supply becomes capable of supplying electric power to the load,
  the first duration is a duration until the first auxiliary power supply becomes capable of supplying electric power to the load since the first auxiliary power supply starts to be charged, and
  the second duration is a duration until the second auxiliary power supply becomes capable of supplying electric power to the load since the second auxiliary power supply starts to be charged.

15. A program executable by one or more processors to execute the power supply backup method according to claim 14.

16. The power supply backup method according to claim 14, further comprising
  determining whether failure of the main power supply occurs or not.

17. The power supply backup method according to claim 14, wherein said causing the backup power supply system to supply electric power to the load while failure of the main power supply occurs comprises:
  while failure of the main power supply occurs, causing the first auxiliary power supply to supply electric power to the load after the first duration elapses since the first auxiliary power supply starts to be charged; and
  while failure of the main power supply occurs, causing the second auxiliary power supply to supply electric power to the load after the second duration elapses since the second auxiliary power supply starts to be charged and while the first duration does not elapse since the first auxiliary power supply starts to be charged.

18. The power supply backup method according to claim 17, further comprising
  while failure of the main power supply occurs, causing the backup power supply system not to supply electric power to the load while the second duration does not elapse since the second auxiliary power supply starts to be charged and while the first duration does not elapse since the first auxiliary power supply starts to be charged.

19. The power supply backup method according to claim 14, wherein
  said causing the main power supply to supply electric power to the load while failure of the main power supply does not occur comprises causing the main power supply to supply electric power to the load and causing the backup power supply system not to supply electric power to the load while failure of the main power supply does not occur, and
  said causing the backup power supply system to supply electric power to the load while failure of the main power supply occurs comprises causing the backup power supply system to supply electric power to the load and causing the main battery not to supply electric power to the load while failure of the main power supply occurs.

20. A backup power supply system comprising:
  a first auxiliary power supply and a second auxiliary power supply configured to supply electric power to a load when failure of a main power supply occurs, wherein:
  a second duration until the second auxiliary power supply becomes capable of supplying electric power to the load is shorter than a first duration until the first auxiliary power supply becomes capable of supplying electric power to the load, and
  the second auxiliary power supply is configured to supply electric power to the load in a second state that the load has smaller power consumption than a first state that the first auxiliary power supply supplies electric power to the load.

* * * * *